United States Patent
Skiba et al.

(10) Patent No.: US 11,049,141 B2
(45) Date of Patent: Jun. 29, 2021

(54) LOCATION ENHANCEMENTS FOR MOBILE MESSAGING

(71) Applicant: Avaya Inc., Santa Clara, CA (US)

(72) Inventors: David Skiba, Golden, CO (US); Andrew Maher, Wiesbaden (DE); George Erhart, Loveland, CO (US); Valentine C. Matula, Granville, OH (US)

(73) Assignee: Avaya Inc., Santa Clara, CA (US)

( * ) Notice: Subject to any disclaimer, the term of this patent is extended or adjusted under 35 U.S.C. 154(b) by 331 days.

(21) Appl. No.: 14/504,238

(22) Filed: Oct. 1, 2014

(65) Prior Publication Data
US 2015/0264176 A1    Sep. 17, 2015

Related U.S. Application Data (60) Provisional application No. 61/952,641, filed on Mar. 13, 2014.

(51) Int. Cl.
*H04M 3/51* (2006.01)
*G06Q 30/02* (2012.01)
(52) U.S. Cl.
CPC ...... *G06Q 30/0261* (2013.01); *H04M 3/5141* (2013.01); *H04M 3/5183* (2013.01)
(58) Field of Classification Search
CPC ............. H04M 3/5141; H04M 3/5183; G06Q 30/0261; G06Q 30/02
USPC .................................................. 379/265.09
See application file for complete search history.

(56) References Cited

U.S. PATENT DOCUMENTS

| | | | | |
|---|---|---|---|---|
| 6,686,849 B1 * | 2/2004 | Cullett | ............... | G08G 1/0965 340/902 |
| 7,058,594 B2 * | 6/2006 | Stewart | ............... | G06Q 10/107 705/14.53 |
| 7,658,327 B2 * | 2/2010 | Tuchman | ............... | G06Q 30/02 235/375 |
| 7,738,509 B2 * | 6/2010 | Piwowarski | ............ | H04W 4/22 340/425.5 |
| 7,805,128 B2 | 9/2010 | Bentley et al. | | |
| 8,036,160 B1 * | 10/2011 | Oakes, III | ............. | G06Q 30/02 370/328 |

(Continued)

OTHER PUBLICATIONS

"Impact Mobile® Own the Street," Impact Mobile, retrieved from http://www.impactmobile.com/proximity-marketing/, modified Jul. 4, 2014, 1 page.

(Continued)

*Primary Examiner* — Ahmad F. Matar
*Assistant Examiner* — Jirapon Intavong
(74) *Attorney, Agent, or Firm* — Sheridan Ross P.C.

(57) ABSTRACT

Handheld communication devices, such as smart phones, comprise a number of data gathering sensors. The sensors may be utilized to provide an agent of a contact center with situational information regarding the user of the handheld device. While global positioning systems (GPS) provides one means to locate a user of a communication device, GPS is not always available. However, by utilizing radio receivers, internal condition sensors, motion detectors, and other sensing components, a situation for a customer may be determined to supplement or substitute for GPS-determined location as well as to identify more relevant situations for the user beyond those provided by GPS provided location information.

20 Claims, 5 Drawing Sheets

(56) References Cited

U.S. PATENT DOCUMENTS

| | | | |
|---|---|---|---|
| 8,405,484 B2 | 3/2013 | Erhart et al. | |
| 8,416,944 B2 | 4/2013 | Erhart et al. | |
| 8,588,733 B2 * | 11/2013 | Ferguson | H04M 1/72541 |
| | | | 379/45 |
| 8,630,610 B2 * | 1/2014 | Shaffer | H04M 3/42068 |
| | | | 455/404.2 |
| 8,634,543 B2 | 1/2014 | Flockhart et al. | |
| 2008/0146193 A1 | 6/2008 | Bentley et al. | |
| 2009/0036091 A1 * | 2/2009 | Ball | G07C 5/008 |
| | | | 455/404.1 |
| 2009/0067586 A1 * | 3/2009 | Fano | H04M 3/51 |
| | | | 379/49 |
| 2010/0235218 A1 | 9/2010 | Erhart et al. | |
| 2010/0296417 A1 | 11/2010 | Steiner | |
| 2011/0066423 A1 | 3/2011 | Erhart et al. | |
| 2011/0071889 A1 | 3/2011 | Erhart et al. | |
| 2011/0125793 A1 | 5/2011 | Erhart et al. | |
| 2011/0125826 A1 | 5/2011 | Erhart et al. | |
| 2011/0196714 A1 | 8/2011 | Erhart et al. | |
| 2014/0106699 A1 * | 4/2014 | Chitre | H04W 76/007 |
| | | | 455/404.1 |
| 2015/0112826 A1 * | 4/2015 | Crutchfield, Jr. | G06Q 30/0601 |
| | | | 705/26.1 |

OTHER PUBLICATIONS

"Kakao Talk: Welcome to the World of Kakao Talk," Kakao, retrieved from http://www.kakao.com/talk/en, modified Oct. 29, 2014, 4 pages.

"Line Partner: Line is looking for partners in our efforts to make communication more pleasant for our users," Line Partner, retrieved from https://partner.line.me/en_US, modified Jan. 16, 2014, 2 pages.

"WeChat: The new way to connect," WeChat, retrieved from http://www.wechat.com/en/, modified Jan. 9, 2015, 2 pages.

"WhatsApp: Simple. Personal. Real Time Messaging," WhatsApp, retrieved from http://www.whatsapp.com/, modified Jan. 9, 2015, 2 pages.

Jing Daily, "Coach Clarins Earn Top Marks for Standout WeChat Prowess," Jing Daily, retrieved from http://jingdaily.com/coach-and-clarins-earn-top-marks-for-standout-wechat-prowess/32355/, Aug. 2, 2013, 3 pages.

Lukman, "Messaging App War: WeChat and Line are Leaving KakaoTalk Behind; WhatsApp Should Be Worried," TECHINASIA, retrieved from https://www.techinasia.com/messaging-app-war-wechat-line-kakaotalk-whatsapp/, Jul. 25, 2013, 5 pages.

Staff, "Iris Mobile Debuts Proximity Based Messaging," NetNewsCheck, retrieved from http://www.netnewscheck.com/article/31967/iris-mobile-debuts-proximity-based-messaging, Feb. 7, 2014, 8 pages.

* cited by examiner

LOCATION ENHANCEMENTS FOR MOBILE MESSAGING

CROSS-REFERENCE TO RELATED APPLICATIONS

The present application claims the benefit of Provisional Patent Application No. 61/952,641, filed on Mar. 13, 2014, and is incorporated herein by reference in its entirety.

FIELD OF THE DISCLOSURE

The present disclosure is generally directed toward electronic communications between a contact center and a mobile device of a customer.

BACKGROUND

Contact centers utilize a variety of communication modes to interact with customers. Initially plain old telephone systems (POTS) provided the communication network connecting customers and contact centers. As communication systems evolved and incorporated new technologies, the new technologies where also incorporated into contact center operations. Now a call between a contact center and a customer may be a traditional telephone call utilizing POTS, voice over Internet protocol (VoIP), cellular telephony and/or other packet-based mediums (e.g., Internet).

In addition to standard voice calls, devices such as mobile device messaging applications that provide message exchange services are increasingly popular. One reason for the popularity of these applications is that they allow users to avoid fees from traditional network service providers (e.g., cellular service providers) by using Wi-Fi and publicly-available networks (e.g., the Internet). The applications provide message exchange services that are multi-modal and allow users to communicate via text chat, images, email, voice, and video. Groups can be established and used to share content to many users at once, regardless of the mobile carriers and/or operating systems of the platforms involved.

SUMMARY

It is with respect to the above issues and other problems that the embodiments presented herein were contemplated.

With respect to certain embodiments, it would advantageous to marry the multi-modal flexibility and popularity of the applications with the customer focus and capabilities of an enterprise, especially a contact center. Contact centers may have a particularly strong concept and focus on high end customer service, including all channels of communication with customers (e.g., voice, video, chat, email, co-browse, social media, etc.).

In one embodiment, a user situation is tied into mobile messaging and sent and/or linked to a contact center to create new history, trends, metrics, regions, zones, combinations, counts, distances, densities, and other aggregate data useful to a contact center to provide various services. The user situation is an evaluated, and preferably determined to be a relevant, aspect associated with the user of a communication device, such as a mobile telephone or smart phone. The user's situation may be determined by any one or more inputs associated with the mobile device, such as location as determined by a GPS component, motion and/or position of the mobile device (e.g., as determined from accelerometers), sounds received by the microphone, images received by the camera, user inputs received on any one or more of the device's input components, radio frequency inputs received from cellular, Bluetooth, WiFi, radio frequency, and/or other transmitters of a portion of the electromagnetic spectrum. While a location determined by GPS may be associated with a situation they are not synonymous. Rather it is the meaning behind the location. Other situations may be wholly or partially indifferent to the user's location (e.g., the customer is not in the store, the customer is hearing an alarm, customer is shopping at a competitor, etc.).

The situation may include any determined aspect relevant to a contact center being present or absent, such as at a particular time for a particular user from one or more of the mobile device's input components. For example, a radio frequency receiver may determine the mobile device is within a certain distance of a WiFi router. The identity of the WiFi router may then be reported and the situation, with respect to proximity to the particular WiFi router known (e.g., "This customer is closest to washing machine number 35.").

In another embodiment, secondary information may be further utilized to determine or refine the situation for a user. For example, a user known to be at O'Hare airport gate C8 may have secondary information accessed, such as customer resource management (CRM) data and weather, news, traffic, trending events, and other current information. Therefore, the user can be determined to be situated in Chicago with a destination of Newark along a flight path that includes severe thunderstorms. In a further embodiment, GPS reports the passenger at gate C8, but due to lag in updating the GPS data, or the unavailability of GPS data, the microphone may detect an announcement for passengers at gate "B10" and provide situation information in contrast to what was previously known.

As was briefly mentioned above, determining a user's situation, with respect to a location on Earth via a GPS receiver/processor of their mobile device, is not always available, accurate, or relevant to a user's situation. In another embodiment, the location of a user with respect to items and/or persons of interest may further define the situation for a user. For example, a user calling a retailer's contact center may find the user's specific coordinates on Earth to be less relevant than to know the user is outside one of the retailer's stores. And more relevant still that the user is walking away from the store.

Location sensing may include one or more of regions and zones; geo-sensing, presence aware, application push, location enabled. While GPS may provide one means to locate a device and associated user, GPS may not be enabled, GPS spoofing or jamming may prevent any, or any reliable, GPS information from being gathered. Privacy settings may prevent GPS information, even if gathered, from being made available.

A contact center apparatus and/or methods may deduce a situation of an individual based on surroundings. The surround may include a current location and/or items within a given proximity. The deduced situation, along with a mobile messaging application, is disclosed that may be used to discover, manage, and/or record the way a customer connects and thereby allows a contact center to understand what is proximate to the customer in relation to routing and services.

Items proximate to the user may include physical things (e.g., washer, dryer, cars, planes, etc.) and/or people (e.g., friends, customers of the company, etc.). The situation may be derived by the combination, count, distance, and/or density of these items with respect to the individual communicating with the contact center (e.g., one of the 183 people stranded due to a cancelled flight on Alpha Airlines, near the voice of sales representative Smith, near a customer talking to agent 345, etc.).

The items may be further classified. For example, three classifications of items may be: items detected by the mobile device, items near/known to be near from the company, items publicly known to be near.

In some embodiments, one or more of the following functions may be executed in a method:

1. A computer scans the area for proximity of things, people, and devices. This information may then be sent over the social mobile application to the back end as a part of the situation information.

2. The back end system performs a search of known entities, people, and devices within proximity of the location.

3. For one or more of the proximate item information, an appropriate user situation is identified for the business (CRM data, transactions, preferences, etc.). The situation may be of a general nature, from the identified location, or specifically targeted for the user who has identified himself, such as through the social mobile application.

4. The gathered data is then used for routing, if appropriate. Routing may be to a general resource or to a specific agent, office, or skill set. Routing may also end at a specific application (e.g., interactive voice response (IVR) type automated dialogs).

5. A resource, such as an agent, responder, etc. may be presented with the proximity situation information such as via a push custom screen information, scripts, tools, and optimized desktop presentation. As a benefit, the resource may then respond with a richer set of facts for the customer and/or a specific circumstance of the customer.

By way of a non-limiting example, a customer contacting a contact center may be near two hundred other ABC Airlines customers, suggesting that the customer might be in an airport. The situation information discovered may then be used in the routing decision, in this case to an agent handling problems for this specific airport. The situation may also be used to deliver the appropriate script to the agent, possibly updated exception information for flights out of this airport or provide an airport map for the agent to refer the customer to the local service desk to pick up a changed ticket. In a further example, knowing the customer is attached the network using a WiFi device within the executive lounge at the airport further provides the situation of the customer.

In a second non-limiting example, if there are dozens of washers/dryers nearby, the customer could be in a Laundromat instead of at home. The system could deduce that the customer is not near a personal washer with a problem but rather an appliance owned by someone else. This example could use the information if a user was calling for help with a specific unit by calling the maker of the unit.

In a third non-limiting example, a user is in a shopping mall looking at a display vehicle. When calling or accessing the site for more detailed information the application would know they were at a single display location and not a dealer showroom or not in proximity of a model car. The information may look up the location to route to the car model specialist instead of a general sales representative. The information could be used in automated application to present options like route to dealer location or to a human to talk to or an automated summary of deals on this model.

In one embodiment, a communication device is disclosed, comprising: a scanning module operable to receive inputs from a sensing component of the device and detect a situation-indicating signal from the sensing component; a communications component operable to enable a first communication between a user of the device and an agent of a contact center; and wherein the communication component is further operable to enable a second communication between the scanning module and a situation analysis module of the contact center so that the situation analysis module obtains information to determine a situation associated with the user from the second communication and cause indicia of the situation associated with the user to be transmitted to the agent of the contact center.

In another embodiment, an electronic communication system is disclosed, comprising: a communication device; a contact center, operable to communicate with the communication device; wherein the contact center comprises a situation analysis module; wherein the communication device further comprises a scanning module operable to receive inputs from a sensing component of the communication device and detect a situation-indicating signal from the sensing component; wherein the communication device and the contact center communicate using a first communication between a user of the communication device and an agent of the contact center and using a second communication between the scanning module and the situation analysis module of the contact center; and wherein the situation analysis module obtains information to determine a situation associated with the user from the second communication and cause indicia of the situation associated with the user to be transmitted to the agent of the contact center.

In still another embodiment, a customer management system is disclosed, comprising: a situation analysis module; a work task processing module operable to receive a work task for processing by an agent of a contact center; a communications component operable to enable a first communication between a user of a communication device and the agent, the first communication comprising the work task, being associated with the first communication; wherein the communication component is further operable to enable a second communication with a scanning module receives inputs from a sensing component of the communication device operable to detect a situation-indicating signal from the sensing component; wherein the situation analysis module obtains information to determine a situation associated with the user from the second communication, determine indicia of the situation; and a presentation device operable to transmit the indicia to the agent processing the work task.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

The identification in the description of element numbers without a subelement identifier, when a subelement identifiers exist in the figures, when used in the plural, is intended to reference any two or more elements with a like element number. A similar usage in the singular, is intended to reference any one of the elements with the like element number. Any explicit usage to the contrary or further qualification shall take precedence.

The exemplary systems and methods of this disclosure will also be described in relation to analysis software, modules, and associated analysis hardware. However, to avoid unnecessarily obscuring the present disclosure, the following description omits well-known structures, components and devices that may be shown in block diagram form, and are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
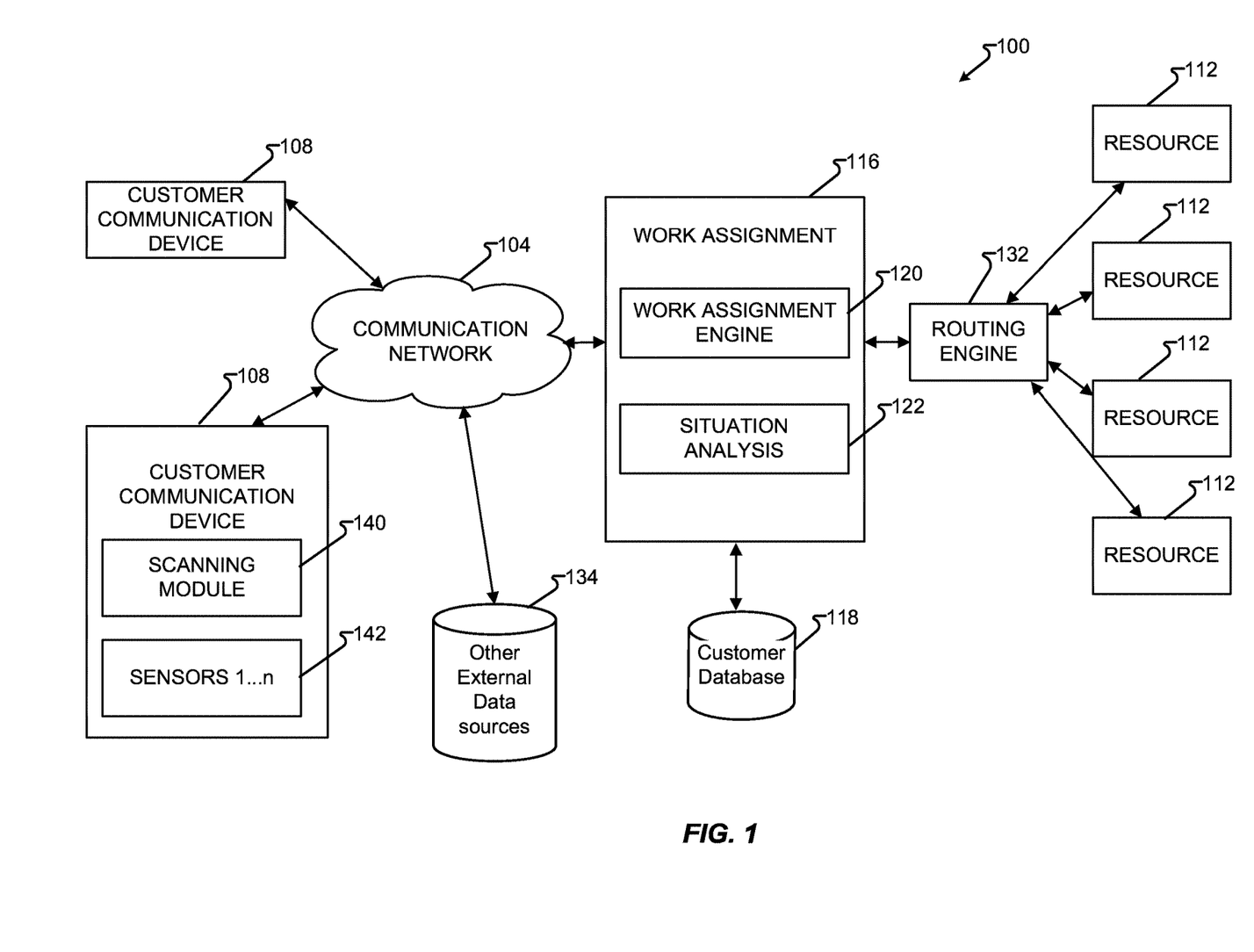
FIG. 1 shows an illustrative communication system in accordance with at least some embodiments of the present disclosure.

FIG. 1 shows an illustrative communication system 100 in accordance with at least some embodiments of the present disclosure. The communication system 100 may be a distributed system and, in some embodiments, comprises a communication network 104 connecting one or more communication devices 108 to a work assignment module 116, which may be owned and operated by an enterprise administering a contact center in which a plurality of resources 112 are distributed to handle incoming work items (in the form of contacts) from customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes and Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Illustrative work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. An example of such a harvested communication includes a social media communication that is harvested by the work assignment module 116 from a social media network or server. Exemplary architectures for harvesting social media communications and generating work items based thereon are described in U.S. patent application Ser. Nos. 12/784,369, 12/706,942, and 12/707,277, filed Mar. 20, 1010, Feb. 17, 2010, and Feb. 17, 2010, respectively, each of which are hereby incorporated herein by reference in their entirety.

The format of the work item may depend upon the capabilities of the communication device 108 and the format of the communication. In particular, work items are logical representations within a contact center of work to be performed in connection with servicing a communication received at the contact center (and more specifically the work assignment module 116). The communication may be received and maintained at the work assignment module 116, a switch or server connected to the work assignment module 116, or the like until a resource 112 is assigned to the work item representing that communication at which point the work assignment module 116 passes the work item to a routing engine 132 to connect the communication device 108 which initiated the communication with the assigned resource 112.

Although the routing engine 132 is depicted as being separate from the work assignment module 116, the routing engine 132 may be incorporated into the work assignment module 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In another embodiment, at least one customer communication device 108 comprises scanning module 140 and sensors 142. Sensors 142 may be any one or more components or systems whereby customer communication device 108 may receive input. Sensors 142 may include, but are not limited to, a microphone, a specialty microphone (e.g., operable above and/or below normal human speech frequencies), imager (e.g., camera, non-visible spectrum imager, light detector), tactile input (e.g., button, touch screen, pressure, switch, etc.), accelerometer (e.g., motion, orientation), radio receiver (e.g., GPS, WiFi, cellular, Bluetooth, near field, etc.), operating parameter (e.g., configuration, temperature, battery state, signal meter, etc.), and/or other sensing device. Scanning module 140 monitors sensors 142 to identify one or more situation indicating signals. Scanning module 140 may further identify one or more relevant situation indicating signals. In one alternative embodiment, a compressed, truncated, summary, or other abbreviated form may be evaluated and/or passed to situation analysis module 122, such as to reduce the volume of data exchanged. In a further embodiment, scanning module 140 may identify inputs from sensors 142 to include and/or exclude according to the likelihood of being determined relevant.

In accordance with at least some embodiments of the present disclosure, the work item is sent toward a collection of processing resources 112 via the combined efforts of the work assignment module 116 and routing engine 132. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment module 116 and resources 112 may be owned and operated by a common entity in a contact center format. In some embodiments, the work assignment module 116 may be administered by multiple enterprises, each of which has their own dedicated resources 112 connected to the work assignment module 116.

In some embodiments, the work assignment module 116 comprises a work assignment engine 120 which enables the work assignment module 116 to make intelligent routing decisions for work items. In some embodiments, the work assignment engine 120 is configured to administer and make work assignment decisions in a queueless contact center, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center.

The work assignment engine 120 and its various components may reside in the work assignment module 116 or in a number of different servers or processing devices. In some embodiments, cloud-based computing architectures can be employed whereby one or more components of the work assignment module 116 are made available in a cloud or network such that they can be shared resources among a plurality of different users.

In one embodiment, a message is generated by customer communication device 108 and received, via communication network 104, at work assignment module 116. The message received by a contact center, such as at the work assignment module 116, is generally, and herein, referred to as a "contact." Routing engine 132 routes the contact to at least one of resources 112 for processing.

In another embodiment, situation analysis 122 identifies and/or determines a situation associated with a particular contact. Situational analysis 122 may, in whole or in part, determine which resource 112 receives the contact. Situational analysis 122 may provide assistance to the selected resource 112, based on the indentified and/or determine contact situation, to better assist the selected resource 122 in processing the contact. For example, a pop-up or other display and/or audio, such as a whisper-mode voice prompt may be provided to the selected resource 122 to assist in processing the contact in accord with the situation. In another embodiment, additional information may be accessed to be presented to the selected resource 112 in order to assist in processing the contact.

Figure 2:
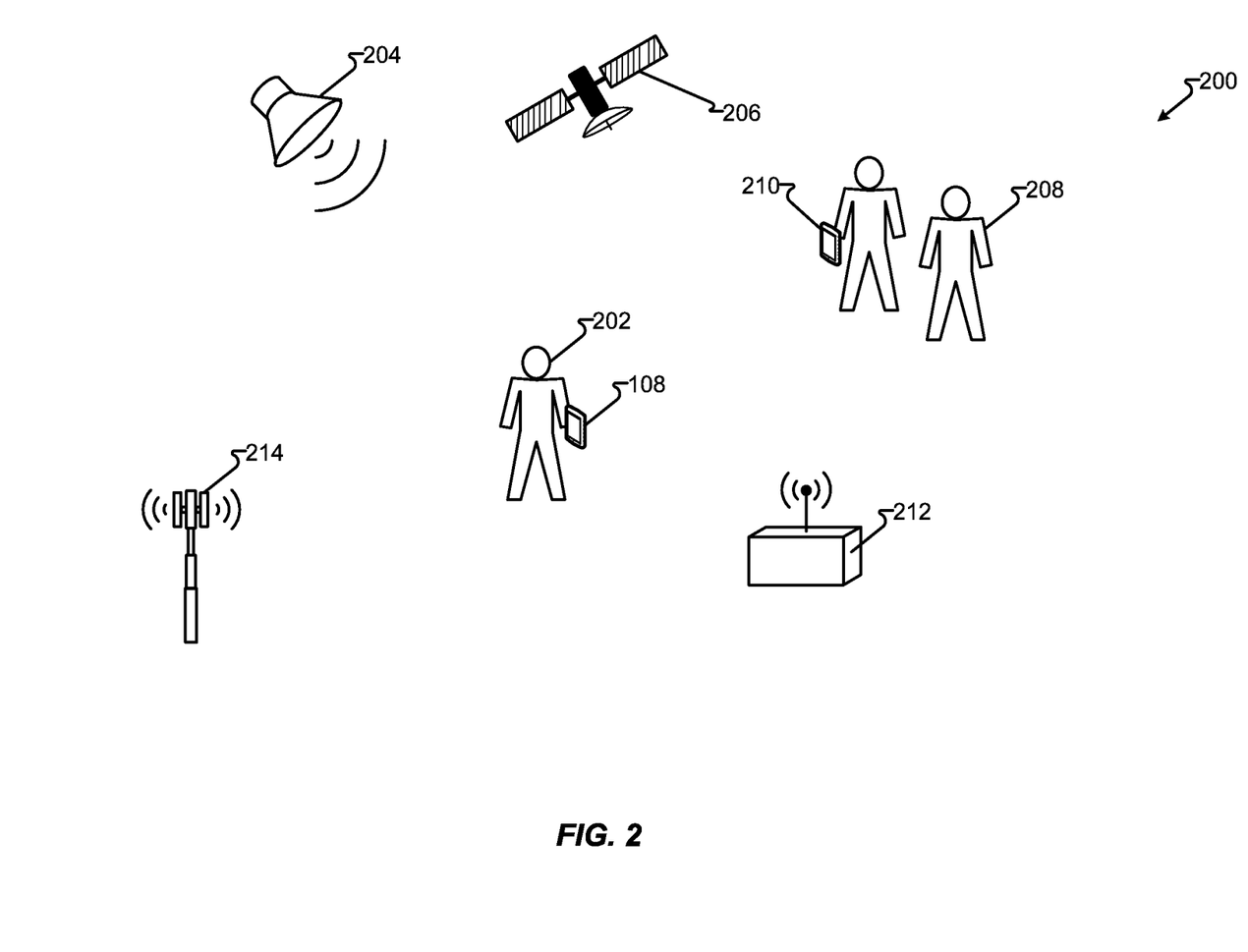
FIG. 2 shows one environment for operating customer communication device in accordance with at least some embodiments of the present disclosure.

FIG. 2 shows one environment 200 for operating customer communication device 108 in accordance with at least some embodiments of the present disclosure. User 202 and associated customer communication device 108 may be in an environment whereby sensors 142 (see FIG. 1) of customer communication device 108 receive input from audio devices 204, satellite 206, other user devices 210, other people 208 (e.g., speech), objects 212 operable to transmit audio and or electromagnetic signals (e.g., near field, WiFi, encoded sound, etc.), cellular transmitters 214, and/or other devices. In addition to the foregoing, the orientation of customer communication device 108 to the Earth, light level, configuration (e.g., docked, open, etc.), temperature, battery level, and/or other inputs may also be provided by environment 200.

It is one object of the present disclosure to determine a situation for user 202. In one embodiment, sensors 142 produce data. However, not all data from each of sensors 142 will necessarily indicate a relevant situation. For example, user 202 may contact an agent 112 (e.g., one of resources 112) and before or during the interaction between user 202 and agent 112, the location of user 202 may be determined by GPS signal from satellite 206, cellular tower 214, and/or a WiFi object 212 and provided to situation analysis engine 122. Scanning module 140 may examine each location and/or situation indicating source and provide an input to situation analysis engine 122. In another embodiment, scanning module 140 may provide a determined subset of location providing inputs. For example, the GPS signal from satellite 206 and location determination from one or more cellular towers 214 may provide a first set of situation indicators. However, scanning module 140 may detect an identifier associated with a signal from object 212. The identifier may include WiFi enabled object 212 and be readily ascertainable by a human observer (e.g., "FamilyTrucksterDisplay1234," "Clothes4Ustore33," "LaundryKingDryerSN30223A93S," etc.) or obfuscated (e.g., "FFF938343x343," etc.).

Scanning module 140 may be programmed to identify certain identifiers or report all identifiers. Situation analysis engine 122, may then determine whether the user being proximate to object 212 indicates a situation. As will be discussed in more detail to respect to the figures that follow, an indicia of the situation may be transmitted to an agent and then presented to an agent, such as to display, "Customer is standing next to the Family Truckster display at the City Mall." Additionally, supplemental information may be provided in response to the indicia and presented to the agent (e.g., "Incentive for the customer to visit a dealership <click here>," "Special lease terms <click here>," etc.).

In another embodiment, customer communication device 108 may be operating an application, such as a social media application, which may further provide functionality and/or performance with respect to certain embodiments disclosed herein. For example, user 202 may be next to the "Family Truckster" and launch an application, web page, social media page, or other application associated with the manufacturer, dealership, or other entity associated with the sale of "Family Trucksters." As a benefit, scanning module 140 may execute as a portion of, or in communication with, the application and examine sensors 142 having a known association and discarding inputs not associated with the vehicle. As a further example, user 202 using customer communication device 108 navigates to an application associated with the "Family Truckster" and, prior to user 202 initiating a call to an agent, the application in communication with scanning module 140 determines a number of irrelevant objects 212 (e.g., clothing stores, other customers, etc.) and exclude them from further processing.

Figure 3:
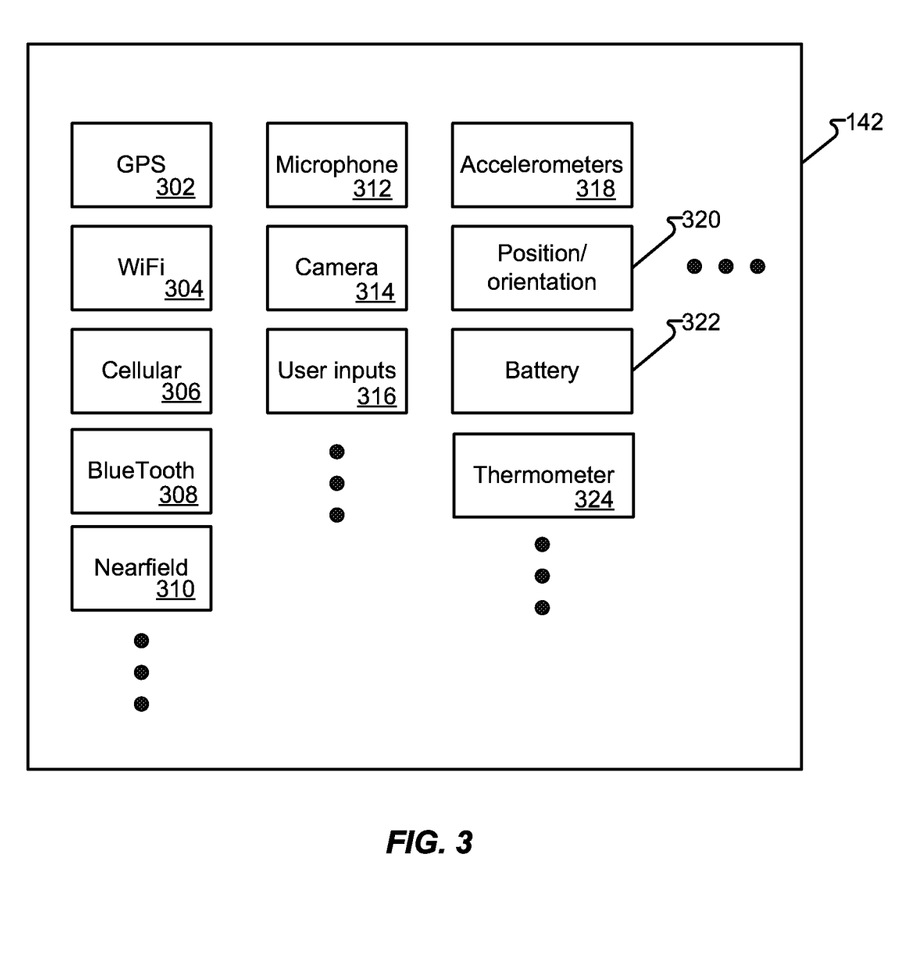
FIG. 3 shows an illustrative sensors in accordance with at least some embodiments of the present disclosure.

FIG. 3 shows illustrative sensors of sensors 142 in accordance with at least some embodiments of the present disclosure. Sensors 142 may include radio frequency, sound, and light receivers, as well as, internal sensors. More specifically, sensors 142 may include one or more of GPS receiver 302, WiFi receiver 304, cellular telephone receiver 306, Bluetooth receiver 308, near field radio receiver 310, and/or other forms of broadcast signal receiver; microphone 312, camera 314, user inputs 316, accelerometer 318, position/orientation sensor 320, battery state sensor 322, thermometer 324, and/or other sensors as may be incorporated within customer communication device 108.

Figure 4:
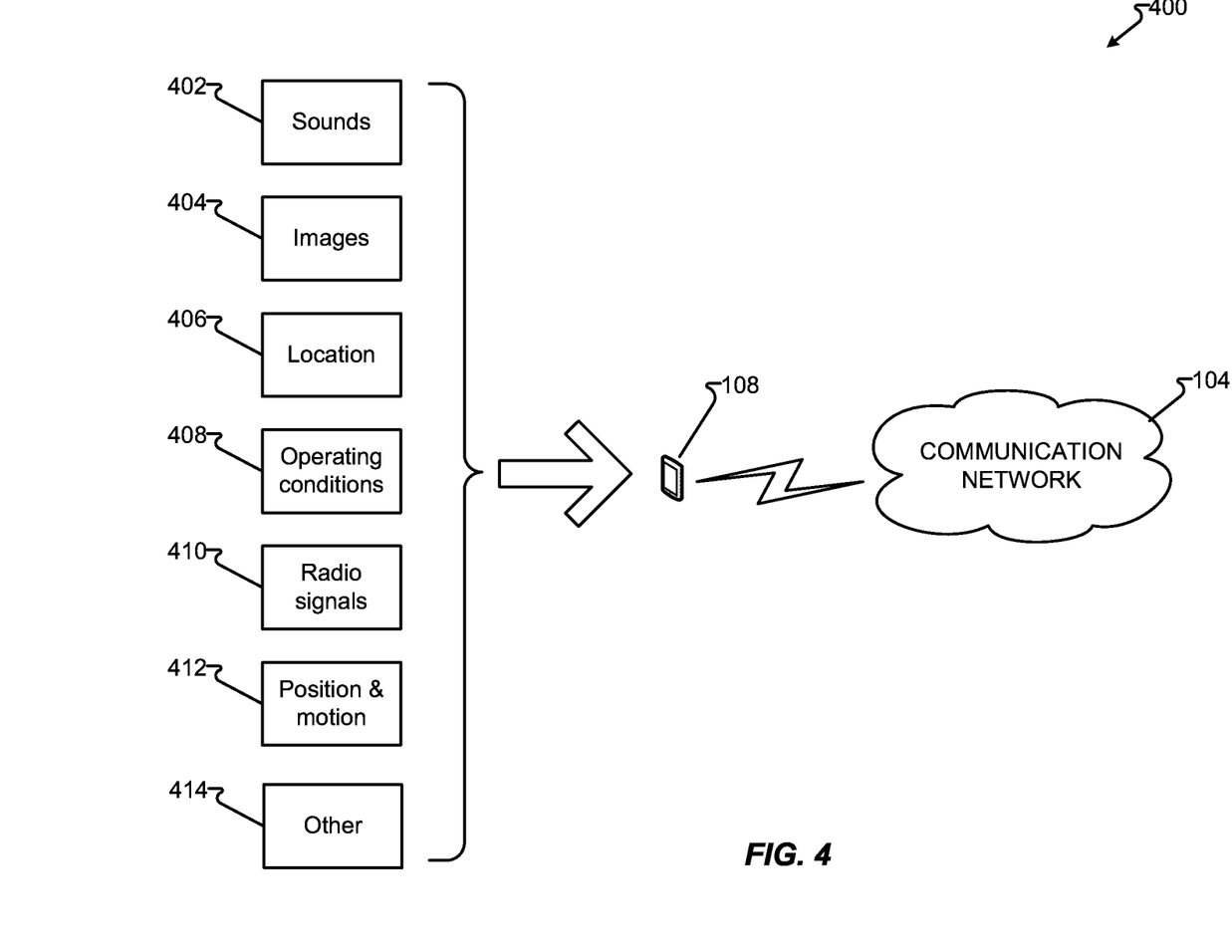
FIG. 4 shows an illustrative communication system in accordance with at least some embodiments of the present disclosure.

FIG. 4 shows illustrative communication system 400 in accordance with at least some embodiments of the present disclosure. In one embodiment, customer communication device 108 is operable to communicate with communication network 104 via a second communication and components also logically attached to communication network 104 (see FIG. 1). Customer communication device 108 comprises a number of information gathering components and subsystems. Information that may be gathered includes sounds 402, images 404, location 406, operating conditions 408, radio signals 410, and/or position and motion 412. The aforementioned information types that may be gathered is not intended to be an exhaustive list. Other information 414 may include nearly any information that may be gathered by customer communication device 108 and/or a device associated with customer communication device 108.

In another embodiment, scanning module 140 within customer communication device 108 selectively monitors and/or queries sensors 142 and, upon determining a situation indicating signal is present from sensors 142, transmitting the situation indicating signal to a contact center via communication network 104. The situation indicating signal may be the entire signal, a portion of the signal, a summary, a truncation, a partial analysis, a complete analysis, or other means of transmitting data and/or a partial or entire meaning of the data.

In one embodiment, the second communication comprises an application utilized by the wireless communication device to communicate using a communication network to the contact center. The application and contact center may utilize known and/or proprietary communication means, such as SMS, MMS, SMTP, SSH, FTP, HTTP, HTTPS, and/or other communication protocol operable to provide a channel of communication. In another embodiment, communication may piggyback on the first communication, such as by utilizing spare packet capacity for carrying the second communication.

Figure 5:
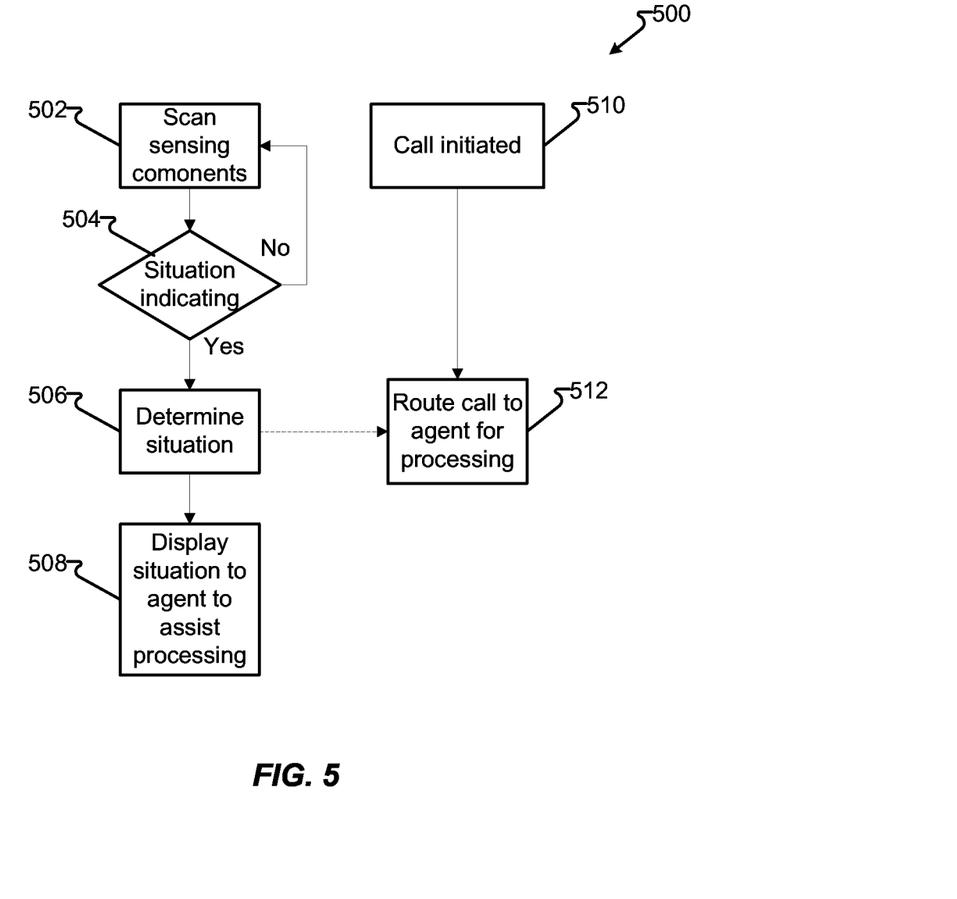
FIG. 5 shows a process in accordance with at least some embodiments of the present disclosure.

FIG. 5 shows process 500 in accordance with at least some embodiments of the present disclosure. In one embodiment, step 502 scans a number of sensors of a mobile communication device, such as by scanning module 140 scanning sensors 142 of customer communication device 108. Step 504 determines if a situation indicating signal has been detected and if yes, processing continues to step 506. If no, processing may terminate or return to step 502. Step 506 determines the situation such as a location, when GPS is not available, proximity to an object or person, motion of the device, or other aspect which may be determined in conjunction with sensors 142. The situation, or indicia of the situation, may then be transmitted to and agent for presentation to the agent processing a call by the user.

Step 510 is a call being initiated between the user and their customer communication device 108 and an agent 112. The call may be incoming or outgoing. And, as will be appreciated by those of ordinary skill in the art, the call may be a voice call, video call, text message, email message, co-browse, or other form of communication supported by customer communication device 108 and application operating thereon. Step 512 routes the call to a particular agent 112. Optionally, step 512 may consider the situation as one input into the routing decision selecting the particular agent 112. Step 508 presents the situation to the agent to assist the agent in processing the call. The presentation may be a display (e.g., message, pop-up window, etc.) and/or audio (e.g., whisper message), or other form of presentation to agent 112.

In one example, a user who is proximate to a particular item that is transmitting a radio signal, an identifiable audio signal, or other information may allow a situation determination module, such as situation analysis 112, to determine a more relevant situation. In particular, GPS may be unavailable and proximity to the object, for example a vehicle on display and transmitting an identifiable Bluetooth or WiFi signal, may allow an agent to know that the customer is proximate to the vehicle. Step 512 may route a call made by the user to a particular agent to assist the customer and provide additional incentives, such as to motivate the customer to visit a showroom or take a test drive at a dealership.

In certain embodiments, steps 502 and 510 may be made substantially in parallel. In other embodiments, step 502 may occur prior to step 510. In one example, a user opens an application that begins step 502. Process 500 may be held at step 502 until step 510 is detected as being initiated. In another embodiment, step 510 occurs first and then causes step 502, and subsequent steps, to execute. One benefit of such embodiments is the reduction of data gathered, processed, and transferred prior to knowing if a call will be made.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A communication device, comprising:
a sensing component receiving a signal from a source;
a scanning module receiving inputs from the sensing component and detecting a situation-indicating signal from the inputs;
a communications component providing a first communication between a user of the communication device and an agent of a contact center and a second communication between the scanning module and the agent of the contact center comprising the situation-indicating signal, wherein the first communication and the second communication occur in parallel; and
wherein a situation analysis module determines a situation associated with the user from the situation-indicating signal of the communication device being proximate to the source and the communication device being within a certain distance of the source and therefrom causes indicia of the situation to be presented to the agent of the contact center; and
wherein the sensing component comprises a microphone operable to receive a first audio signal associated with a voice of the user and to receive a second audio signal comprising the situation-indicating signal and the second audio signal being different from the first audio signal.

2. The communication device of claim 1, wherein the first communication is associated with a work item of the contact center and the indicia of the situation is presented to the agent to facilitate processing the work item by the agent.

3. The communication device of claim 1, wherein the second audio signal is received prior to the agent joining the first communication.

4. The communication device of claim 1, wherein the sensing component further comprises a radio frequency receiver operable to receive a first radio signal associated with the first communication and a second radio signal comprising a situation-indicating radio signal and the second radio signal being different from the first radio signal.

5. The communication device of claim 4, wherein the second radio signal is received from a radio transmitter determined to be associated with a situation-indicating object.

6. The communication device of claim 1, wherein the sensing component is operable to receive inputs comprising one or more of sound, images, location, operating parameter, radio signal, orientation detector, and motion detector.

7. The communication device of claim 6, wherein the sensing component is operable to receive inputs comprising two or more of sound, images, location, operating parameter, radio signal, orientation detector, and motion detector.

8. The communication device of claim 7, wherein the scanning module receives the inputs further comprising a plurality of inputs from each of the two or more one or more of sound, images, location, operating parameter, radio signal, orientation detector, and motion detector inputs and detecting the situation-indicating signal from the plurality of inputs.

9. An electronic communication system, comprising:
a communication device;
a contact center communicating with the communication device;
wherein the contact center comprises a situation analysis module;
wherein the communication device further comprises a scanning module operable to receive inputs from a sensing component of the communication device and detect a situation-indicating signal from the sensing component from a received signal from a source;
wherein the communication device and the contact center communicate using a first communication between a user of the communication device and an agent of the contact center and using a second communication between the scanning module and the situation analysis module of the contact center comprising the situation-indicating signal, wherein the first communication and the second communication occur in parallel; and
wherein the situation analysis module determines a situation associated with the user from the situation-indicating signal of the communication device being proximate to the source and the communication device being within a certain distance of the source and therefrom causes indicia of the situation to be presented to the agent of the contact center; and
wherein the sensing component comprises a microphone operable to receive a first audio signal associated with a voice of the user of the communication device and to receive a second audio signal comprising the situation-indicating signal and the second audio signal being different from the first audio signal.

10. The system of claim 9, wherein the first communication is associated with a work item of the contact center and the indicia of the situation is presented to the agent to facilitate processing the work item by the agent.

11. The system of claim 9, wherein at least a portion of the second audio signal is received prior to the agent joining the first communication.

12. The system of claim 9, wherein the second audio signal includes speech associated with a situation and wherein the situation comprises a location.

13. The system of claim 12, wherein the location is further associated with an activity and the situation comprises the activity.

14. The system of claim 9, wherein the sensing component further comprises a radio frequency receiver operable to receive a first radio signal associated with the first communication and a second radio signal comprising a situation-indicating radio signal and the second radio signal being different from the first radio signal.

15. The system of claim 14, wherein the second radio signal is received from a radio transmitter determined to be associated with a situation-indicating object.

16. The system of claim 14, wherein the second radio signal is received from a radio transmitter determined to be associated with a situation-indicating object and the situation-indicating object is further associated with a work item of the contact center.

17. A customer management system, comprising:
a situation analysis module;
a work task processing module receiving a work task for processing by an agent of a contact center;
a communications component enabling a first communication between a user of a communication device and the agent, the first communication comprising the work task, and being associated with the first communication;
wherein the communication component further enables a second communication with a scanning module that receives inputs from a sensing component of the communication device and is operable to detect a situation-indicating signal from the sensing component receiving a signal from a source, wherein the second communication occurs in parallel with the first communication;
wherein the situation analysis module determines a situation from the situation-indicating signal of the communication device being proximate to the source and the communication device being within a certain distance of the source and determines therefrom indicia of the situation;
wherein the sensing component comprises a microphone operable to receive a first audio signal associated with a voice of the user of the communication device and to receive a second audio signal comprising a situation-indicating signal and the second audio signal being different from the first audio signal; and
a presentation device operable to transmit the indicia of the situation to the agent processing the work task.

18. The customer management system of claim 17, further comprising:
a customer management database; and
wherein the situation analysis module is further operable to access at least one record of the customer management database associated with the user and evaluate the at least one record to determine the indicia of the situation.

19. The customer management system of claim 17, further comprising:
a customer management database; and wherein the situation analysis module is further operable to access at least one record of a third party service provider associated with the user and evaluate the at least one record of the third party service provider to determine the indicia of the situation.

20. The customer management system of claim 19, wherein the third party service provider is at least one of a weather service provider and a news service provider.

\* \* \* \* \*